United States Patent [19]

Haskell

[11] 4,300,161

[45] Nov. 10, 1981

[54] TIME COMPRESSION MULTIPLEXING OF VIDEO SIGNALS

[75] Inventor: Barin G. Haskell, Tinton Falls, N.J.

[73] Assignee: Bell Telephone Laboratories, Incorporated, Murray Hill, N.J.

[21] Appl. No.: 126,422

[22] Filed: Mar. 3, 1980

[51] Int. Cl.[3] .......................... H04N 7/08; H04J 3/00
[52] U.S. Cl. ..................................... 358/142; 370/109
[58] Field of Search ................. 358/142, 146; 370/109

[56] References Cited

U.S. PATENT DOCUMENTS 3,697,682  10/1972  Berg ..................................... 178/6.8

FOREIGN PATENT DOCUMENTS 599366  3/1978  U.S.S.R. .

OTHER PUBLICATIONS

Klauder et al., "The Theory and Design of Chirp Radars", *The Bell System Technical Journal*, vol. 39, No. 4, Jul. 1960, pp. 745-808.
Flood et al., "Time-Compression-Multiplex Transmission," *Proc. of IEEE*, vol. 111, No. 4, Apr. 1964, pp. 647-668.
Gerard et al., "The Design & Application of Highly Dispersive Acoustic Surface-Wave Filters", *IEEE Trans. on Microwave Theory and Tech.* vol. MTT-21, No. 4, Apr. 1973, pp. 176-186.
Bristol, "Modern Radar Pulse Compression Techniques", *NEREM (Northeast Electronics Research & Eng. Mtg.)* 1974 Record, vol. 16, Oct. 1974, pp. 65-72.

*Primary Examiner*—John C. Martin
*Attorney, Agent, or Firm*—Richard J. Roddy

[57] ABSTRACT

Frequency and time division multiplexing arrangements are common for efficiently utilizing bandwidth in a communication system. Still another, lesser known arrangement is called time compression multiplexing. In time compression multiplexing, a signal from each input channel is stored for a short period of time. The signals from all channels are then read from the store, compressed in time and transmitted over a communication path to a receiver. Unfortunately, the art appears to be remiss in the time compression multiplexing of video signals. The subject signal processor includes a plurality of input terminals (111, . . . , 11N), each input terminal being adapted to receive a video signal, each video signal including a plurality of scan lines, each scan line having a time duration T seconds. The signal processor also includes an arrangement for compressing a video signal by a factor M (illustratively M=N). More specifically, the signal processor compressing arrangement includes apparatus (120, 131, . . . , 13N) for modulating each input video signal with a chirp signal. A first, predetermined delay (142, . . . , 14N) is introduced to the modulated signals, which may be added (150). The compressing arrangement also includes apparatus (160) for introducing a second, variable delay to the modulated video signals, e.g., with a dispersive filter (160). The resultant time compressed signal is extracted from the dispersive filter output by an envelope detector (170) and extended over a communication path (300) to a receiver (200) where the time compressed signal is expanded through a receiver modulator (230), distributing apparatus (240), dispersive filter (261, . . . , 26N) and envelope detector (271, . . . , 27N) for extension to a plurality of output terminals (281, . . . , 28N).

6 Claims, 3 Drawing Figures

FIG. I (A) NORMALIZED CHIRP SIGNAL AMPLITUDE (B) CHIRP SIGNAL INSTANTANEOUS FREQUENCY (C) CHIRP SIGNAL AMPLITUDE

TIME COMPRESSION MULTIPLEXING OF VIDEO SIGNALS

TECHNICAL FIELD

This invention relates to signal processing and, more particularly, to video signal processing including time compression multiplexing of video signals.

BACKGROUND OF THE INVENTION

One common communication medium employs frequency division multiplexing.

In frequency division multiplexing, a signal from an input channel is usually shifted in frequency by a transmitter modulator. The shifted signal then occupies a different portion of the frequency band, the band having been allocated for transmitting signals over a communication path between the transmitter and a receiver. For example, U.S. Pat. No. 3,697,682; issued Oct. 10, 1972 and entitled "Video Signal Processing"; discloses a method and apparatus according to which fields of a video frame are frequency interleaved. Each frame comprises a succession of P fields. Each field represents a different group of scan lines and thus each field includes a plurality of scan lines. Also, each field is of equal field scan time duration $T_f$. In scanning a frame, each field of the frame is delayed by a time equal to the scan time $T_f$ multiplied by a factor (P-i) where i represents the ordinal place of the field in the succession of fields which comprise the frame, i.e., $i=1, 2, \ldots, P$. Thus, the first field of the frame is delayed a time $T_f$ multiplied by (P-1) while each succeeding field of the frame is delayed for a delay time equal to the delay time of the preceding field less the time of one field scan. Thereby, the respective fields coexist in time. Thereafter, each of the P fields is frequency shifted by a sinusoid having a frequency for shifting each field a different submultiple of the scan line frequency. As a result, the bandwidth of the resultant frequency multiplexed signal is essentially the same as that of the original video signal.

Another common communication medium employs time division multiplexing.

In time division multiplexing, the signal from an input channel modulates a train of pulses that are interleaved with the pulse trains of other channels. For example, the Bell System T1 carrier system interleaves a signal from each of 24 input channels in a respective one of 24 time slots of a resultant 1.544 megabits per second time multiplexed signal.

Thus, in frequency division multiplexing, the signal of each channel uses only a fraction of the bandwidth of the communication path but occupies the bandwidth all of the time. On the other hand, in time division multiplexing, the signal of each channel occupies the communication path only for a fraction of the time, i.e., during its time slot, but during that fraction of time the whole bandwidth is available to the signal.

Another form of multiplexing is called time compression multiplexing.

In time compression multiplexing, the signal from each input channel is stored for a short period of time. The signals from all channels are then read from the store, compressed in time, and transmitted sequentially, one after the other, over the communication path. See, for example, the publication by J. E. Flood et al, "Time-Compression-Multiplex Transmission", *Proceedings of the Institution of Electrical Engineers*, Vol. 111, No. 4, (April 1964), pp. 647–668.

Unfortunately, the time compression multiplexing art appears remiss in the processing of video signals.

SUMMARY OF THE INVENTION

This and other problems are solved by my improved apparatus for time compressing video signals. An illustrative signal processor, in accord with the principles of my invention, includes a plurality of input terminals, each input terminal adapted to receive a video signal, the video signal including a plurality of scan lines, and a scan line having a predetermined time duration. The signal processor compresses in time the duration of each scan line of the video signal by a predetermined compression factor, the signal compressing apparatus including a plurality of delay networks for introducing a first, predetermined delay in the video signal and an adder for adding delay network output signals. The sum output of the adder is extended through a dispersive filter and thence an envelope detector as a sequence of time compressed signals. According to one aspect of my invention, the signal processor for time compressing a video signal includes apparatus for modulating each video signal and for extending the modulated signal through the first, predetermined delay network and thereafter for introducing a second, variable delay to the modulated signal whereby a time compressed video signal obtains. According to another aspect of my invention, the modulated signal obtains by multiplexing the video signal with a chirp signal. According to still another aspect of my invention, the time compressed video signal is extended to a receiver where the compressed signal is expanded by an arrangement for modulating the time compressed signal and for introducing a third, variable delay therein and for extracting the expanded video signal therefrom.

BRIEF DESCRIPTION OF THE DRAWING

My invention should become fully apparent when taken in connection with the following detailed description and the accompanying drawing in which.

DETAILED DESCRIPTION

Figure 1:
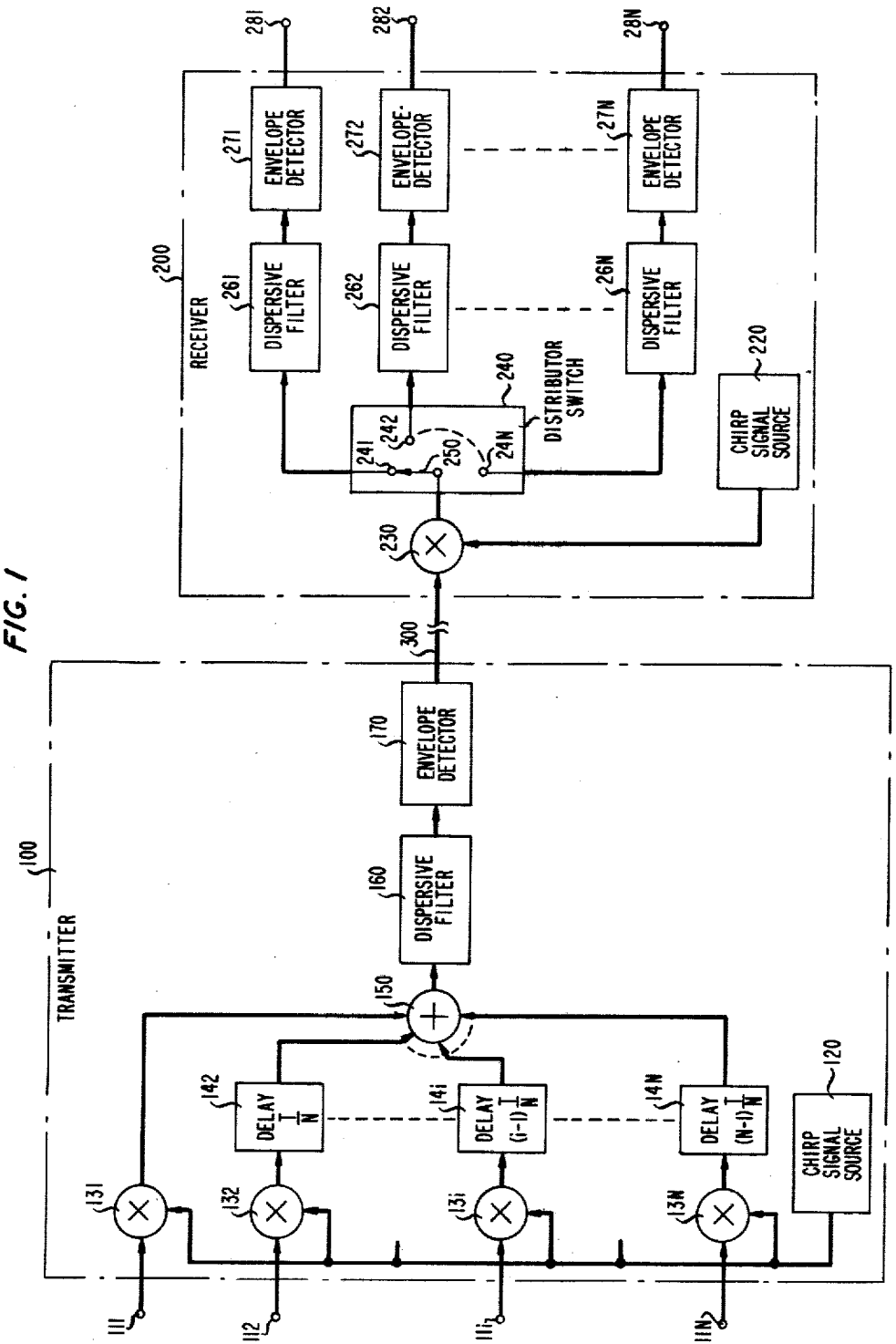
FIG. 1 illustrates a signal processor in accord with the principles of my invention.

FIG. 1 illustrates a signal processor including time compression apparatus illustrative of and in accord with the principles of my invention. Broadly, video signals from N respective, usually synchronized, sources are extended to respective ones of input terminals 111 through 11N of transmitter 100 and therein processed for compressing the N synchronized video signals into a predetermined time slot of a time multiplexed signal. The time compressed signals are then extended over communication path 300 to receiver 200 and therein processed for expanding the compressed signals and for extending N reconstructed synchronized video signals to respective ones of output terminals 281 through 28N.

More particularly, the N video signals, each video signal having a plurality of scan lines and a scan line having a predetermined time duration, here for ease of description assume each scan line is of time duration T seconds, are respectively extended from input terminals 111 through 11N to transmitter 100 and therein to a first input of a respective one of modulating multipliers 131 through 13N. A second input of each multiplier is a first chirp signal extended from chirp signal source 120. A modulated signal output of each of multipliers 132 through 13N is extended to an input of a respective delay network 142 through 14N for introducing a first, predetermined delay thereto. The respective first delay is equal to the product of two components, the first component being the quotient obtained by dividing the line scan time T by a predetermined compression factor M. Again for ease of description, and not by way of limitation, assume hereinafter that compression factor M is equal to the number of input terminals N, i.e., M = N. The quotient is multiplied by the second component, the second component being (i-1) where i represents the ordinal number of the input terminal extending the video signal, i.e., i = 1, 2, . . . , N. Thereby, the first, predetermined delay is obtained. It may be noted that, for i = 1, a delay of (i-1 = ) zero seconds, i.e., no delay, is introduced to the modulated output of multiplier 131 and accordingly its delay network, which would have had identity 141, is omitted from FIG. 1. An output from each of delay networks 142 through 14N as well as an output from multiplier 131 is extended to a respective input of adder 150. The resultant output sum of adder 150 is extended through dispersive filter 160 for introducing a second, variable delay and thence through envelope detector 170 for transmission as the time compressed signal over communication path 300.

Within receiver 200, the received time compressed video signal is extended to a first input of modulating multiplier 230. A second input to multiplier 230 is a second chirp signal extended from chirp signal source 220. An output of multiplier 230 is extended to an input of distributor switch 240. Illustratively, the input of switch 240 is coupled to wiper 250 for cyclical connection of the switch input to a switch output terminal 241 through 24N. The cycle time of switch 240 is equal to the scan line time T. Hence, wiper 250 is cyclically connected to each switch output terminal for a time duration T/N seconds. More specifically, wiper 250 may be connected to terminal 241 during the interval (0, T/N) and may be connected to terminal 242 during the interval (T/N, 2T/N) and may be connected to terminal 243 during the interval (2T/N, 3T/N), et cetera. Each respective one of the N outputs of switch 240 is extended to an input of a respective dispersive filter 261 through 26N for introducing a third, variable delay and thence to an input of a respective envelope detector 271 through 27N for extracting the compressed video signal and thence to a respective receiver output terminal 281 through 28N for extension to a respective video signal sink.

Thusly, transmitter 100 is for time compressing each of N synchronized video signals from a time duration T seconds to a time duration T/N seconds while receiver 200 is for time expanding the compressed signals. Further and according to the principles of my invention, the time compressing and the time expanding obtains by advantageous use of, for example, chirp signals, dispersive filters, and envelope detectors.

Figure 2:
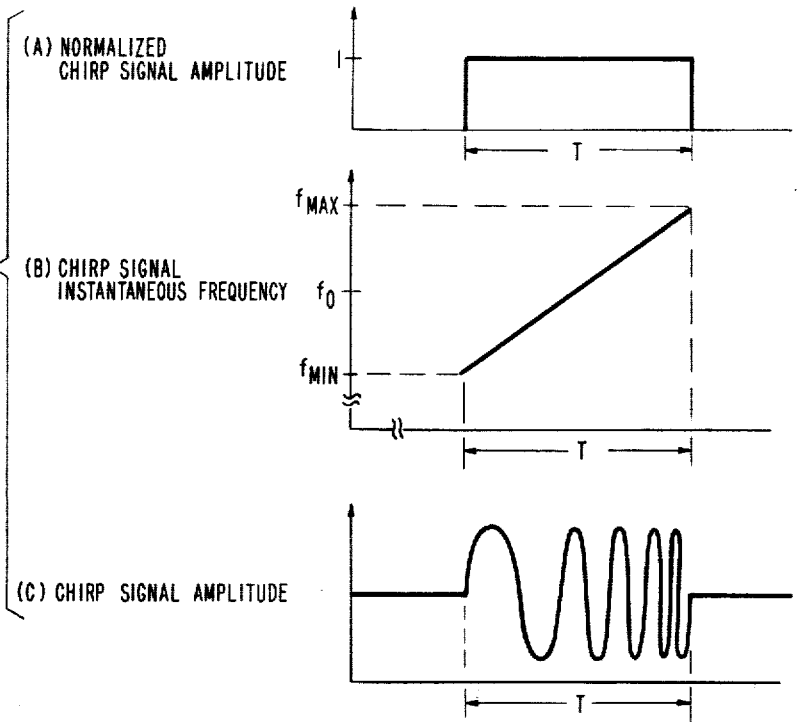
FIG. 2 illustrates chirp signal wave forms of a type useable in the signal processor of FIG. 1.

As to chirp signals, chirp signals are commonly found in the radar art. See, for example, the publication by J. R. Klauder et al, "The Theory and Design of Chirp Radars", *The Bell System Technical Journal*, Vol. 39, No. 4, (July 1960), pp. 745-808. Common chirp signals are frequency modulated (FM) signals and include a frequency which varies linearly with time. For example, referring to FIG. 2(a), an illustrative chirp signal is there shown normalized as to amplitude. The amplitude of the chirp signal includes a relatively flat, rectangular envelope over a time duration at least equal to the line scan time T. Referring to FIG. 2(b), the illustrative chirp signal includes a frequency which has a positive slope and is linear with respect to time over a predetermined time duration, here over a time duration of at least T seconds. FIG. 2(c) illustrates a chirp signal having the properties described above relative to FIGS. 2(a) and 2(b). Still more specifically, over a line scan time interval (0, T), my illustrative linear FM chirp signal is assumed to have a transmitter chirp frequency $f_t$ where:

$$f_t = f_{min} + \frac{f_{max} - f_{min}}{T} t \qquad (1)$$

and $f_{max}$ and $f_{min}$ define a maximum and a minimum frequency, respectively, and hence a frequency band over which the chirp signal frequency is to be linear. Further, the phase $\phi(t)$, of my chirp signal, which equals the time integral of the chirp frequency $f_t$, is given as:

$$\phi(t) = f_{min}t + \frac{f_{max} - f_{min}}{2T} t^2 \qquad (2)$$

Hence, my illustrative transmitter chirp signal, as provided by chirp signal source 120, may be straightforwardly implemented using apparatus for supplying a unit amplitude sinusoid. For example, chirp source 120 provides a signal equal to cos $\phi(t)$ where cos $\phi(t)$ represents a unit amplitude cosine signal of phase $\phi(t)$.

Figure 3:
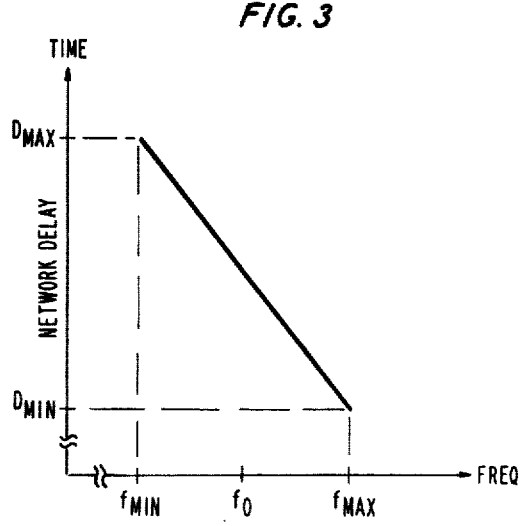
FIG. 3 illustrates a dispersive filter characteristic of a type useable in the signal processor of FIG. 1.

As to dispersive filters, FIG. 3 illustrates a typical linear delay versus frequency characteristic of a dispersive filter. In my illustrative embodiment, the dispersive filter has a relatively flat, rectangular amplitude versus frequency characteristic at least over the frequency range $(f_{min}, f_{max})$, see, for example, FIG. 2(a). Also, the dispersive filter has a linear delay D(f) versus frequency f characteristic of the form $$D(f) = D_{max} - \frac{D_{max} - D_{min}}{f_{max} - f_{min}} (f - f_{min}) \qquad (3)$$

where $D_{max}$ and $D_{min}$ define a maximum and a minimum delay, respectively, over the frequency range $(f_{min}, f_{max})$. For notational convenience in describing an illustrative embodiment of my invention, let the following symbol definitions be used:

$$\left. \begin{array}{l} D = D_{max} - D_{min} \\ F = f_{max} - f_{min} \end{array} \right\} \qquad (4)$$

First, consider the output $m_i(t)$ of multiplier 13i, the output being coupled to an input of a dispersive filter. Notationally, the i-th ordinal video signal, extended from the i-th input terminal of transmitter 100, may be represented as $v_i(t)$. Hence, the modulated signal output $m_i(t)$ of multiplier 13i may be represented as:

$$m_i(t) = v_i(t) \cos \phi(t); \ 0 \leq t \leq T \qquad (5)$$

Such is then the form of the output of each of multipliers 131 through 13N, each of which may be coupled to the input of a respective i-th transmitter dispersive filter (not shown). Inasmuch as a dispersive filter introduces a delay to its input signal, the amount of delay being related to the frequency of the input signal, it is clear that a second, variable delay $D(f_i)$ will be introduced or imparted to signal $m_i(t)$. Accordingly, the output of the dispersive filter occurs at a time $t_d$, time $t_d$ occurring $D(f_{t_o})$ seconds after the time $t_o$ that $m_i(t_o)$ is detected at the dispersive filter input i.e., $$\left. \begin{array}{l} t_d = t_o + D(f_{t_o}), \text{ or} \\ t_d = t_o\left(1 - \dfrac{D}{T}\right) + D_{max} \end{array} \right\} \quad (6)$$

Second, as aforedescribed, each of delay networks $14i$ imparts a first, predetermined delay of $(i-1)T/N$ seconds to its input signal. Hence, delay network $14N$ imparts the maximum delay of the delay networks $14i$. Assume that the range of dispersive filter delay $D$ ($=D_{max}-D_{min}$) is equal to the delay imparted by network $14N$; or $$D = (N-1)(T/N) \quad (7)$$

Substituting equation (7) into equation (6) yields:

$$t_d = (t_o/N) + D_{max} \quad (8)$$

Since time $t_o$ occurs in a cyclic time interval $(O, T)$, it becomes clear that the dispersive filter output occurs in a cyclic time interval $(D_{max}, (T/N)+D_{max})$. Such a cyclic interval also allows for a linear time transformation of equation (8); e.g., $$t_t = t_d - D_{max} \quad (9)$$

with the clear result that transformed time $t_t$ occurs in the cyclic time interval $(0, T/N)$. Further, the input to the linear dispersive filter $m_i(t_o)$ results in an output $m_i(Nt_t)$ $$m_i(Nt_t) = v_i(Nt_t) \cos \phi(Nt_t) \quad (10)$$

which is equivalent to the chirped, or modulated, dispersive filter input being time compressed by a factor N to a time interval $(0, T/N)$. Hence, the input video signal is time compressed from a time duration T seconds to a time duration T/N seconds.

Third, assume that, before being extended to the input to a dispersive filter, each chirped signal $m_i(t)$ for $i = 2, \ldots, N$ is extended through a delay network $14i$ for imparting a first, predetermined delay of $(i-1)T/N$ seconds thereto. Hence, the output of the dispersive filter, while being a compressed chirp signal of the form of equation (10), has introduced thereto both a first, predetermined delay and a second, variable delay. For example, for $i=2$, a delay of $T/N$ is imparted to the chirped signal before same is extended to the dispersive filter. Hence, $m_2(t)$ is time compressed by a factor N to a time interval $(T/N, 2T/N)$, et cetera. Therefore, in general, $m_i(t)$ is time compressed by a factor N to a time interval $$\left(\dfrac{(i-1)T}{N}, \dfrac{iT}{N}\right).$$

Clearly, there are N such intervals in the scan line interval $(O, T)$.

Fourth, inasmuch as the dispersive filter is linear, time invariant, and follows the well known superposition theorem, one dispersive filter, i.e., filter 160, is included in my transmitter 100. That is, the need for a separate dispersive filter coupled to the output of each delay network $14i$ is obviated.

As to envelope detectors, which are well known in the art, assumes the highest frequency of a video signal $v_i(t)$ is substantially less than $f_{min}$. For example, assume that the highest frequency of signal $v_i(t)$ is of the order of several megahertz. Further assume $f_{min}$ is of the order of several hundred megahertz. In such a case, $m_i(t)$ resembles an amplitude-modulated (AM) signal with a frequency equalling the chirp signal frequency $f_t$ and with an envelope being the video signal $v_i(t)$. Inasmuch as the output of dispersive filter 160, which is a compressed version of $m_i(t)$, which is extended to an input of envelope detector 170, an output of detector 170 is the time compressed video signal.

At receiver 200, the time compressed video signals are expanded. Recall that the transmitter time duration $(0, T)$ has been compressed to a receiver time duration $(0, T/N)$. Further, recall that the transmitter is for compressing and the receiver is for expanding. Accordingly, the slope of the receiver chirp signal is the inverse of the slope of the transmitter chirp signal. In my illustrative embodiment, chirp source 220 provides a chirp signal with negative slope, i.e., the inverse of that illustrated in FIG. 2(b). Hence, chirp signal source 220 extends, to a second input of modulating multiplier 230, a chirp signal $\cos \phi_r(t)$, which has receiver chirp frequency $f_r$:

$$f_r = f_{max} - \dfrac{F}{(T/N)} t \quad (11)$$

and a phase $\phi_r(t)$ $$\phi_r(t) = f_{max}t - \dfrac{NF}{2T} t^2, \quad (12)$$

both over receiver time interval $(0, T/N)$. The chirped signal output $M_i(t)$ of multiplier 230 is then $$M_i(t) = v_i(Nt) \cos \phi_r(t) \quad (13)$$

As aforementioned, the output of multiplier 230 is coupled to wiper 250 of distributor switch 240 for cyclic connection to switch output terminal $24i$ where it is so provided for a time duration T/N seconds and thence to an input of dispersive filter $26i$, for introducing a third variable delay of the form described by equation (3). Thus the output of dispersive filter $26i$ occurs at a time $t_D$, time $t_D$ occurring $D(f_r)$ seconds after the time $t_1$ that $M_i(t_1)$ is detected at the input of filter $26i$, i.e., $$\left.\begin{array}{l} t_D = t_1 + D(f_r); \text{ or} \\ t_D = t_1\left(1 + \dfrac{ND}{T}\right) + D_{min}; \text{ or} \\ t_D = Nt_1 + D_{min} \end{array}\right\} \quad (14)$$

Using a linear time transformation of the form $$t_r = t_D - D_{min} \quad (15)$$

results in the output of dispersive filter 26i being describable in the form $v_r(t_r) \cos \phi_r(t_r/N)$, which is another chirped signal with envelope $v_r(t_r)$. The envelope is detected by envelope detector 27i for extension as the expanded video signal to receiver output terminal 28i.

Although my invention has been described and illustrated in detail, it is to be understood that the same is by way of illustration and example only. For example, although the chirp signal provided by chirp source 120 assumes a linear chirp signal with positive slope, same could have a negative slope in which event the slope of chirp source 220 would be a positive slope. Accordingly, various modifications will occur to those skilled in the art and the invention is not to be considered limited by the embodiment shown for purposes of disclosure. Thus, the spirit and scope of the invention are limited only by the appended claims.

I claim:

1. A signal processor including a plurality of input terminals (111, . . . , 11N) each input terminal adapted to receive a video signal, said video signal including a plurality of scan lines, a scan line having a predetermined time duration, first means for compressing said video signal, said first compressing means including a plurality of first delay networks (142, . . . , 14N), an adder (150) for adding said compressed signals and means for extending a sum output of said adder to a communication path (300) and CHARACTERIZED IN THAT said signal processor further comprises:

second means coupled to said first compressing means for time compressing said video signals by a compression factor M, said second time compressing means including (a) means (120, 131, . . . 13N) for modulating each of said input video signals;
(b) means (160) responsive to said modulated video signal for introducing a second, variable delay to said modulated video signal; and
(c) means (170) responsive to said second delay introduced signal for extracting a time compressed replica of said video signal and for extending said replica to said communication path.

2. The signal processor defined in claim 1 wherein said video signal modulating means includes:
   a chirp signal source (120); and
   multiplier means (131, . . . , 13N) responsive to said chirp signal and to one of said video signals for providing said modulated video signal.

3. The signal processor defined in claim 1 further comprising:
   means (300) for extending said time compressed signal from a transmitter (100) to a receiver (200), said receiver for expanding said time compressed signal and for extending said expanded signal to a respective one of a plurality of output terminals (281, . . . , 28N).

4. The signal processor defined in claim 3 wherein said receiver expanding means includes:
   means (220, 230) for modulating said time compressed signal;
   means (240, 250) for distributing said modulated, signal to respective distributing terminals (241, . . . , 24N);
   means (261, . . . 26N) for introducing a third, variable delay to said distributed, modulated, time compressed signal;
   means (271, . . . , 27N) responsive to said distributed, modulated, time compressed signal for extracting said expanded video signal therefrom; and
   means for extending said expanded video signal to a respective one of a plurality of output terminals (281, . . . , 28N).

5. The signal processor defined in claim 1 wherein said means for introducing a second, variable delay includes a dispersive filter.

6. The signal processor defined in claim 4 wherein said means for introducing a third, variable delay includes a dispersive filter.

* * * * *